Figure 1:
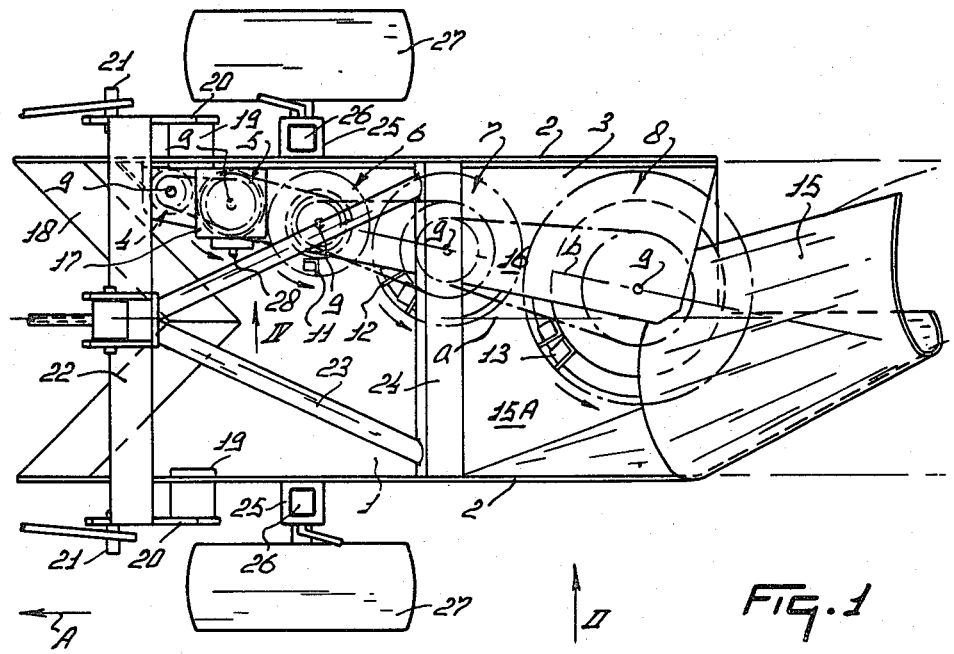

United States Patent [19]

van der Lely

[11] 4,364,436
[45] Dec. 21, 1982

[54] PLOUGHS

[76] Inventor: Cornelis van der Lely, 7 Brüschenrain, Zug, Switzerland

[21] Appl. No.: 217,674

[22] Filed: Dec. 18, 1980

[30] Foreign Application Priority Data

Dec. 21, 1979 [NL] Netherlands ............... 7909235

[51] Int. Cl.³ .................................. A01B 9/00
[52] U.S. Cl. ........................... 172/33; 172/70; 172/714; 172/718; 172/146; 172/167
[58] Field of Search ............... 172/33, 1, 718, 151, 172/167, 192, 760, 51, 19, 20, 733, 429, 439, 169, 146, 714–717, 396, 421, 759, 67, 70, 71

[56] References Cited

U.S. PATENT DOCUMENTS

| | | | |
|---|---|---|---|
| 191,036 | 5/1877 | Dyer | 172/718 X |
| 201,765 | 3/1878 | Fisher | 172/760 X |
| 670,743 | 3/1901 | Swebilius | 172/718 X |
| 1,209,848 | 12/1916 | Kernan et al. | 172/33 X |
| 1,503,874 | 8/1924 | Block | 172/33 |
| 1,867,517 | 7/1932 | Lofstrand | 172/718 X |
| 2,517,721 | 8/1950 | Schleper | 172/718 X |
| 2,650,532 | 9/1953 | Moldowan | 172/19 |
| 2,693,139 | 11/1954 | Focht | 172/33 |
| 3,077,231 | 2/1963 | Hamilton | 172/429 X |
| 3,923,104 | 12/1975 | Tibbs | 172/733 X |

FOREIGN PATENT DOCUMENTS

| | | | |
|---|---|---|---|
| 71903 | 6/1916 | Austria | 172/717 |
| 136262 | 12/1918 | United Kingdom | 172/167 |
| 999969 | 7/1965 | United Kingdom | 172/718 |
| 578915 | 11/1977 | U.S.S.R. | 172/169 |
| 578916 | 11/1977 | U.S.S.R. | 172/33 |

*Primary Examiner*—Paul E. Shapiro
*Attorney, Agent, or Firm*—William B. Mason

[57] ABSTRACT

A plow is structured to wholly or partly invert a furrow slice during operation. The furrow slice is cut loose by a leading V-shaped blade and is both compressed, and deflected laterally towards a side wall of the frame by a plurality of rotary lateral displacing rollers arranged in a row inclined to the direction of travel. The rollers are preferably of progressively increasing size towards the rear and co-operate with a soil guide surface at the rear of the plow in turning the furrow slice about an axis which extends in the direction of travel to deposit the slice substantially completely back into the furrow from which it was originally cut. In one version, the row of displacing rollers leads to a power-driven rotary soil guide unit of annular formation, the inverted furrow slice being delivered back into the furrow from which it was cut through the interior of the unit.

13 Claims, 8 Drawing Figures

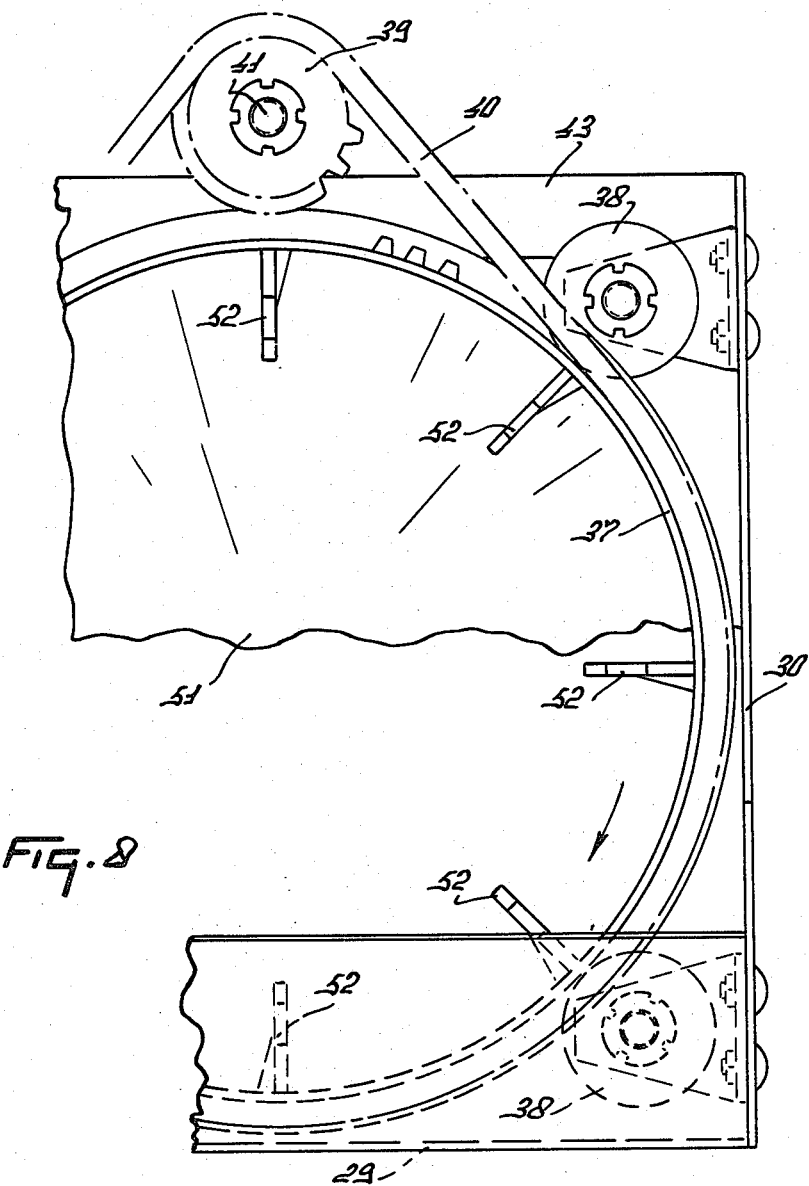

PLOUGHS

This invention relates to ploughs of the kind which comprise a mobile frame and at least one plough member that will wholly or partly invert a furrow slice when the plough is in operation.

In the use of known ploughs of the kind set forth above, the or each furrow slice is laterally displaced so far during its total or partial inversion that it is delivered wholly or principally at one side of the furrow from which it was cut. This operation consumes a large quantity of energy somewhat inefficiently and can adversely affect the soil structure of heavy land by producing so-called "smearing" of the soil.

An object of the present invention is very significantly to reduce the disadvantages of known ploughs of the kind set forth, that are briefly discussed above, and accordingly one aspect of the invention provides a plough which comprises a mobile frame and at least one plough member that will wholly or partly invert a furrow slice when the plough is in operation, characterised in that the plough member includes at least one movable lateral displacing member which, during operation, will co-operate with a further part of the plough member in turning over a cut furrow slice about an axis which extends in the direction of operative travel of the plough at that time. This plough construction enables a cut furrow slice to be subjected to forces that will invert it about substantially its own longitudinal axis or centre line, subsequently depositing it, in its inverted condition, substantially wholly in the furrow from which it was originally cut.

Figure 2:
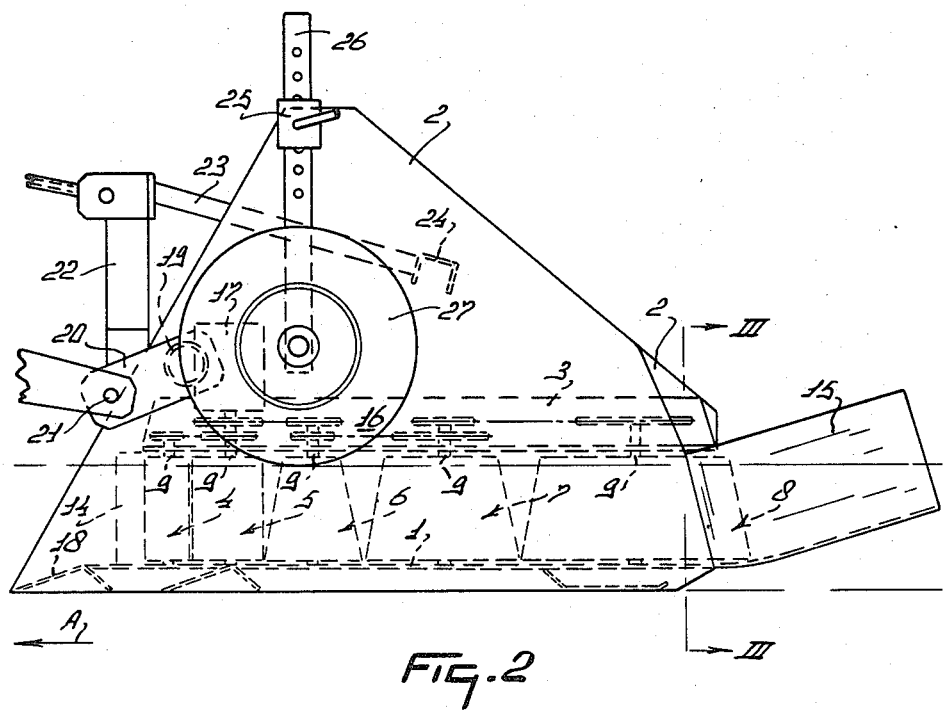
Figure 3:
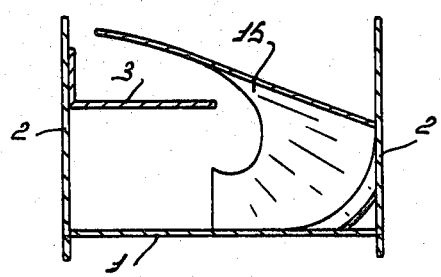
Figure 4:
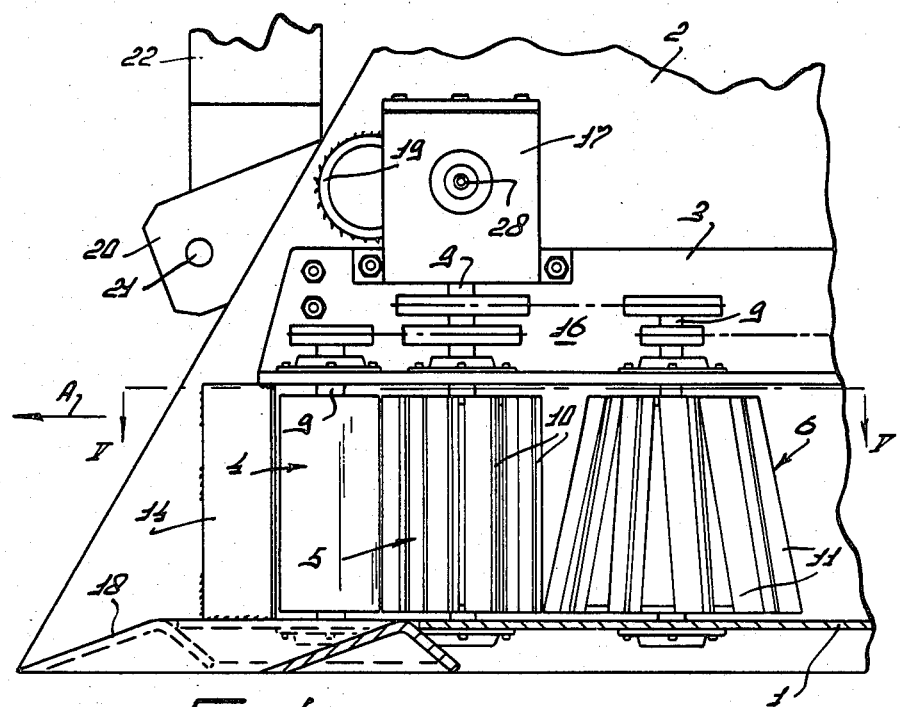
Figure 5:
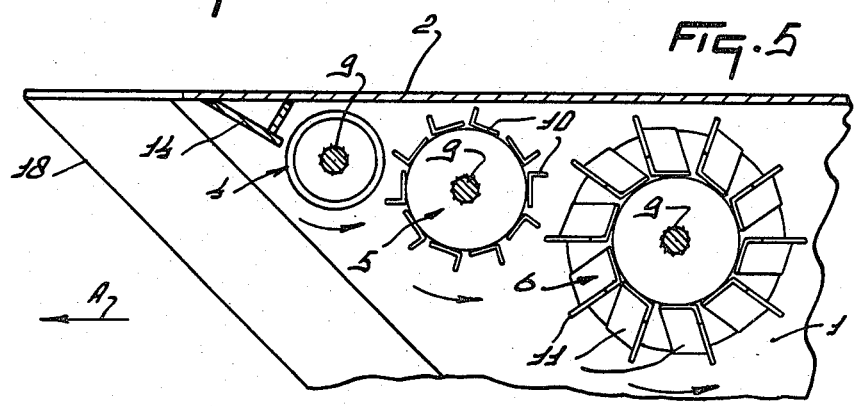
Figure 6:
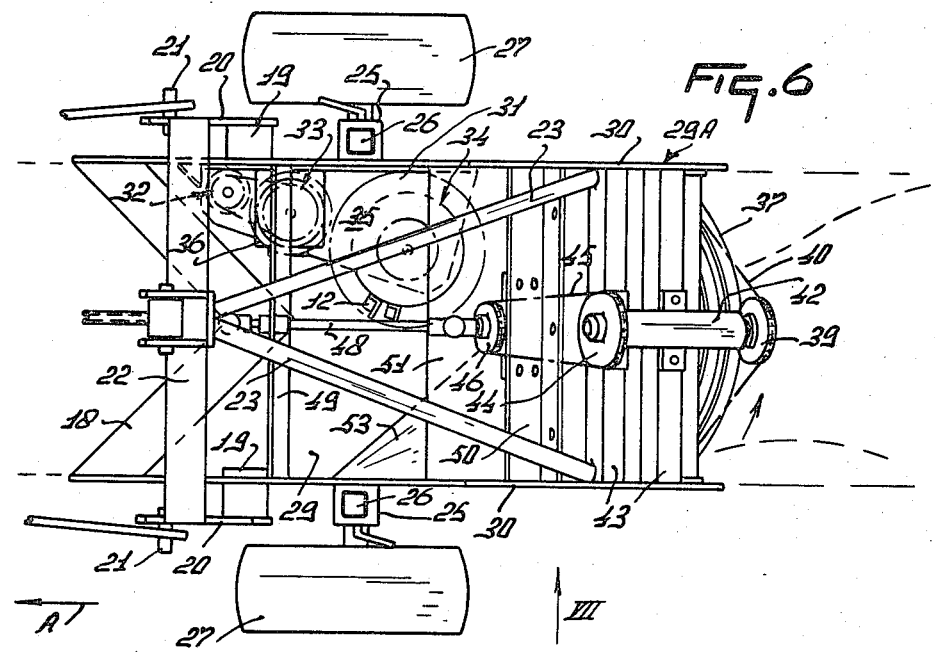
Figure 7:
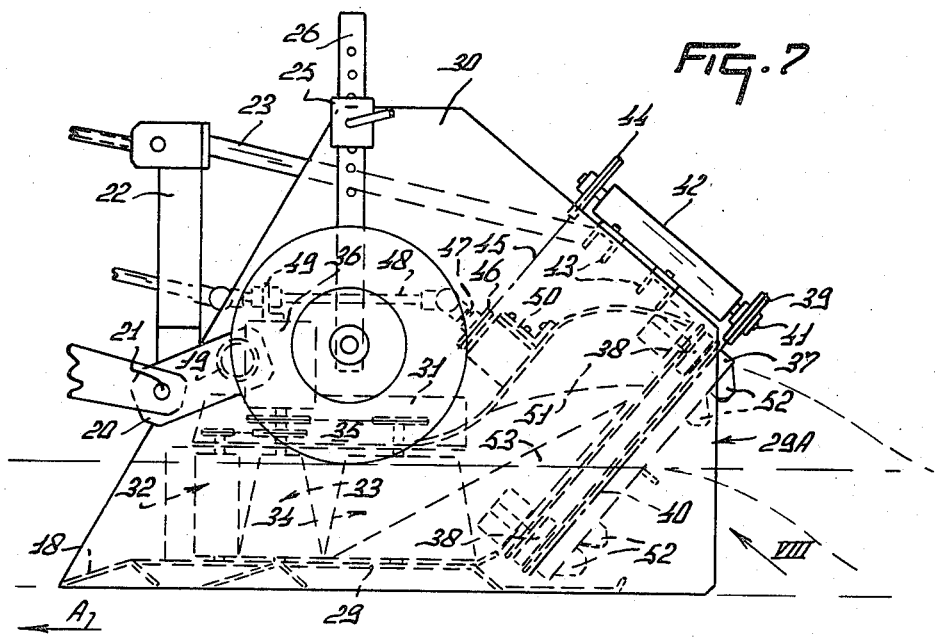

For a better understanding of the invention, and to show how the same may be carried into effect, reference will now be made, by way of example, to the accompanying drawings, in which:

FIG. 1 is a plan view of a plough in accordance with the invention,

FIG. 2 is a side elevation as seen in the direction indicated by an arrow II in FIG. 1, FIG. 3 is a section taken on the line III—III in FIG. 2, FIG. 4 is an elevation of parts of the plough, to an enlarged scale, as seen in the direction indicated by an arrow IV in FIG. 1, FIG. 5 is a section taken on the line V—V in FIG. 4, FIG. 6 is a plan view illustrating an alternative form of plough in accordance with the invention, FIG. 7 is a side elevation as seen in the direction indicated by an arrow VII in FIG. 6, and FIG. 8 is an elevation of parts of the plough of FIGS. 6 and 7, to an enlarged scale, as seen in the direction indicated by an arrow VIII in FIG. 7.

Referring firstly to FIGS. 1 to 5 of the accompanying drawings, the plough that is illustrated therein has a frame which comprises a horizontal or substantially horizontal plate 1 that, when viewed in plan (FIG. 1), is substantially oblong except for its leading edge, with respect to the intended direction of operative travel of the plough that is indicated by an arrow A in most of the Figures of the drawings, said leading edge being of inverse V-shaped configuration as will be referred to again below. The longer parallel edges of the plate 1 are parallel or substantially parallel to the direction A and each of them is connected to a corresponding substantially vertical, or at least upwardly extending, side plate 2, said side plates 2 extending downwardly below the substantially horizontal plate 1 (see FIGS. 2, 3 and 4). As seen in side elevation (FIG. 2), each side plate 2 is of generally, although not strictly, triangular configuration, having its horizontal base edge lowermost. A substantially horizontally disposed supporting plate 3 is fastened to the right-hand side plate 2, when the plough is viewed from the rear in the direction A, so as to lie above part of the area of the substantially horizontal plate 1 in parallel, but spaced, relationship with that plate 1. As seen in plan view (FIG. 1), the supporting plate 3 is of substantially, but not exactly, right-angled triangular configuration, the "hypotenuse" side of the triangle being located against the corresponding side plate 2 while the "opposite" side of the triangle is in oblique relationship with the direction A, extending forwardly relative to that direction from a location which is in approximately vertical register with the longitudinal axis or center line a of the plate 1 to a location that is close to the right-hand (as defined above) side plate 2, the foremost extremities of the "hypotenuse" and "opposite" sides of the substantially, but not exactly, right-angled triangular supporting plate 3 being missing. The rearmost "adjacent" edge of the supporting plate 3 is horizontally perpendicular to the "opposite" edge and is thus in non-perpendicular relationship with the direction A.

A plurality, of which there are five in the example that is being described, of lateral displacing members 4, 5, 6, 7 and 8 are arranged between the substantially horizontal plate 1 and the overlying relatively parallel supporting plate 3. Each of the five lateral displacing members 4 to 8 inclusive is rotatable about the vertical or substantially vertical axis of a corresponding shaft 9, these five parallel axes of rotation being contained in a single substantially vertical plane b (FIG. 1), the plane b being parallel or substantially parallel to the straight "opposite" side of the substantially right-angled triangular supporting plate 3. The longitudinal axis or center line a of the substantially horizontal plate 1 at the bottom of the frame of the plough intersects the plane b at an angle of substantially 12°. The plane b is thus also at an angle of substantially 12° to the direction A. Each of the five lateral displacing members 4 to 8 inclusive is in the form of a roller, the five rollers being of progressively increasing diameter or maximum diameter considered rearwardly of the direction A. In this connection, it is noted that the first and second members/rollers 4 and 5 in the direction A are of right circular cylindrical configuration whereas the three rearmost members/rollers 6, 7 and 8 in the same direction are of upwardly tapering truncated conical configuration. As seen in the side elevation of FIG. 2 of the drawings, the inclined curved surface of each of the members/rollers 6, 7 and 8 is at an angle of substantially 11°, to the strictly vertical. The leading member/roller 4 has a smooth cylindrically curved wall whereas the curved surfaces of the other four members/rollers 5 to 8 inclusive are afforded by assemblies of plates 10, 11, 12 and 13, respectively, with each plate in each assembly having a substantially L-shaped cross-section (FIGS. 4 and 5) of which one limb is secured substantially tangentially to the curved surface of the member/roller concerned whilst the other limb projects radially, or substantially radially, outwardly from said one limb relative to the axis of rotation that is afforded by the longitudinal axis of the respective shaft 9. Each of the assemblies of plates 10 to 13 inclusive comprises a sufficient number of those plates to ensure that they are spaced apart from one another around the respective members/rollers 5 to 8 inclusive by only very short distances, it being noted that these distances inevitably become greater towards the lowermost ends of the members/rollers 6 to 8 inclusive which are of truncated conical configuration. The outwardly projecting limbs of the various plates 10 to 13 inclusive act as soil-engaging catches and it will be noted that a coil guide 14 is provided immediately in front of the leading member/roller 4 with respect to the direction A, the soil guide 14 being in the form of a plate which is rigidly secured to the adjacent frame side plate 2 so as to extend obliquely rearwardly, relative to the direction A, from that side plate 2 towards the leading member/roller 4.

A guide plate 15 and is principally of curved configuration is fastened to the substantially horizontal plate 1 of the frame, and also to the left-hand side plate 2 of that frame when the plough is viewed from the rear in the direction A, at a location which, with respect to the direction A, is approximately in register with the shaft 9 that corresponds to the rearmost displacing member/roller 8. It can be seen in the drawings that the curved plate 15 is inclined upwardly and rearwardly with respect to the direction A, its curved surface being approximately, but not truly, cylindrical in shape and having a longitudinal axis that, in plan view, is in parallel or substantially parallel relationship with the direction A. It will become apparent that the guide plate 15 functions in a manner somewhat reminiscent of that of a mouldboard in a conventional mouldboard plough.

The five shafts 9 which correspond to the five members/rollers 4 to 8 inclusive are drivably interconnected by a chain and sprocket wheel transmission 16 that is diagrammatically illustrated iin FIGS. 1, 2 and 4 of the drawings. The arrangement of this transmission 16 is such that, during operation of the plough, all five of the members/rollers 4 to 8 inclusive revolve in the same direction which is such that the sides of the curved surfaces thereof which are to the left of the respective shafts 9 when the plough is viewed from the rear in the direction A all move rearwardly with respect to that direction A. The chain and sprocket wheel transmission 16 is preferably so arranged that, as illustrated in the drawings, the leading member/roller 4 rotates at the highest speed of the five members/rollers while the other four members/rollers revolve at successively lower speeds, the transmission 16 being located substantially wholly above the supporting plate 3. Thus, during operation, the furrow slice that is to be displaced and inverted by the plough is initiated into lateral displacement by the first smooth-walled member/roller 4, this member/roller 4 not having any soil catches so that slippage can readily occur to reduce any tendency to jerky operation. The output shaft of a hydraulic motor 17 is coupled to the shaft 9 that corresponds to the second displacing member/roller 5, considered in the direction A. The hydraulic motor 17 is secured to the right-hand frame side plate 2 and is releasably connectible, by hydraulic ducts 28 of which only one is illustrated, to the hydraulic power system of an agricultural tractor or other vehicle which moves and operates the plough when the latter is in use. The speed of operation of the hydraulic motor 17 can, of course, be increased or decreased, in a manner that is known per se, when the plough is in use thus enabling the five members/rollers 4 to 8 inclusive to be revolved about the axes of their respective shafts 9 at speeds which are appropriate to the rate of travel of the plough and to the nature and consistency of the soil that is being dealt with.

As mentioned above, the leading edge of the otherwise substantially oblong frame plate 1 is of inverse V-shaped configuration and carries a similarly shaped blade 18 whose point is at the rearmost extremity of the blade, relative to the direction A, and on the longitudinal axis or center line a of the plate 1. However, as can be seen in FIGS. 2 and 4 of the drawings, the cross-sectional shape of the blade 18 is such that its upper leading surface, with respect to the direction A, is upwardly and rearwardly inclined relative to that direction, the uppermost extremity thereof being at substantially the horizontal level of the plate 1. Two substantially horizontally aligned supports 19 are mounted in the opposite side plates 2 of the plough frame at locations close to the upwardly and rearwardly inclined leading edges of those two side plates. The two supports 19 project outwardly from the two side plates 2 and their relatively remote outer ends carry corresponding downwardly and forwardly, relative to the direction A, inclined strips 20. The leading lower ends of the two strips 20 carry substantially horizontally aligned outwardly projecting coupling pins 21 and these coupling pins are intended for connection to the free ends of the lower lifting links of a three-point lifting device or hitch, carried by an agricultural tractor or other vehicle, in a manner which is basically known per se and which is illustrated diagrammatically in FIGS. 1 and 2 of the drawings. The two strips 20 are interconnected by a coupling member or trestle 22 that is of substantially triangular configuration as seen in front or rear elevation, the apex of the coupling member or trestle 22 being provided with a fork, carrying a horizontal pivot pin, and being intended for connection to the upper adjustable-length lifting link of the same three-point lifting device or hitch that co-operates with the two coupling pins 21. A horizontal beam 24 of channel-shaped cross-section rigidly interconnects the two side plates 2 of the plough frame at a location towards, but spaced forwardly from, the rear inclined edges of those two side plates and a pair of rearwardly and downwardly divergent tie beams 23 rigidly interconnect the fork at the top of the coupling member or trestle 22 and locations which are close to the opposite ends of the transverse beam 24. Each of the two frame side plates 2 is provided, at substantially its uppermost extremity, with a corresponding holder 25 in the form of a vertically extending sleeve of square cross-section. Vertically extending wheel carriers 26, of square cross-section, are slidable upwardly and downwardly in the respective holders 25 and each carrier 26 is provided, at its lowermost end, with an outwardly projecting horizontal axle upon which a pneumatically tyred depth control ground wheel 27 is mounted in a freely rotatable manner. It will be apparent from the drawings that the carriers 26 are formed with regularly spaced apart transverse holes and that each holder 25 has a pair of horizontally aligned holes in its opposite walls through both of which a horizontal locking pin can be entered as well as through a chosen one of the holes in the intervening carrier 26. The level of the axes of rotation of the two depth control ground wheels 27 relative to that of the frame of the plough can thus be adjusted to, and retained in, any chosen one of a number of different settings. It is noted that the blade 18, the soil guide 14, the five lateral displacing members/rollers 4 to 8 inclusive, the side plates 2 and the guide plate 15 are considered as collectively affording a plough member 15A (FIG. 1).

In the use of the plough which has been described with reference to FIGS. 1 to 5 of the accompanying drawings, the coupling pins 21 and the coupling member or trestle 22 are employed in a manner which is basically known per se in connecting the frame of the plough to the three-point lifting device or hitch of an agricultural tractor or other operating vehicle. The hydraulic ducts 28 that are connected to the hydraulic motor 17 are coupled, in a manner which is known per se, to the hydraulic system of the same tractor or other operating vehicle to enable the motor 17 to be driven, in a controllable manner, from that tractor or other vehicle. The depth control ground wheels 27 are set at a level, relative to that of the frame of the plough, which is appropriate to the depth of ploughing that is required and to the nature and consistency of the soil which is to be dealt with. As the plough is moved operatively in the direction A, the blade 18 co-operates with the upwardly and rearwardly inclined leading edges of the two frame side plates 2, which edges may be formed as knife edges, in cutting a furrow slice that preferably has a width of substantially 50 centimeters but whose thickness will depend upon the working depth that has been preset by adjustment of the ground wheels 27. The lower surface of the cut furrow slice advances rearwardly, with respect to the direction A, over the upwardly and rearwardly inclined front of the blade 18 until it moves onto the upper surface of the plate 1, which acts as a guide element, being confined at this time between the two side plates 2. It will be apparent that, viewed in the direction A, (see FIG. 3), the plate 1 and the two side plates 2 together afford a channel-shaped trough inside which is disposed the five lateral displacing members/rollers 4 to 8 inclusive. The right-hand extremity of the furrow slice (when viewed from the rear in the direction A) meets the soil guide 14 and is displaced laterally towards the axis or center line a and into engagement with the first member/roller 4. This member/roller 4 has, as discussed above, the greatest speed of rotation of the five members/rollers and has a curved cylindrical surface which allows slippage to take place and any tendency to jerking to be suppressed. Said lateral extremity of the furrow slice is displaced by the member/roller 4 towards the second member/roller 5 that is of cylindrical configuration and that is provided with the assembly of plates 10. This lateral displacement continues towards the member/roller 6 and onwards to the member/roller 7 and finally the member/roller 8, the last three members/rollers being of an upwardly tapering frusto-conical configuration that tends to compress the soil of the slice to a greater extent at the bottom, in the region of the plate 1, than at the top, in the region of the supporting plate 3. The outer surfaces of the five members/rollers 5 to 8 inclusive which the furrow slice meets act together, effectively, as a rearwardly moving wall that is obliquely inclined relative to the direction A away from the right-hand frame side plate 2. Thus, the right-hand extremity of the furrow slice is progressively displaced towards the left-hand frame side plate 2 and the progressively increasing compression, particularly at a level just above that of the plate 1, eventually causes said slice to lean over towards the right as it moves past the final member/roller 8. Simultaneously, the now considerably deformed furrow slice engages the substantially cylindrically curved inner surface of the guide plate 15 and may be considered to be rolled substantially around the upwardly and rearwardly inclined longitudinal axis of that curved surface. Eventually, of course, the displaced and rolled furrow slice moves rearwardly off the rearmost end of the plate 15 and falls back substantially completely into the furrow from which it was originally cut in a completely inverted, or substantially completely inverted, condition as compared with its original disposition when first cut. The construction which has been described enables cut furrow slices of relatively large thickness to be turned over about their own longitudinal axes and to be re-deposited, in a substantially completely inverted condition, wholly or substantially wholly in the furrows from which they were cut. This substantially eliminates the unnecessary and frequently disadvantageous lateral displacement of furrow slices that is produced by conventional ploughs.

The plough that is illustrated in FIGS. 6 to 8 of the drawings is similar in many respects to the plough that has already been described with reference to FIGS. 1 to 5 of those drawings and, accordingly, parts which have already been described are indicated in FIGS. 6 to 8 inclusive by the same references as are employed in FIGS. 1 to 5 inclusive and will not be described in detail again. In this case, the plough has a plough member that is generally indicated by the reference 29A, said plough member comprising a substantially horizontal base plate 29 that is similar in shape and disposition to the previously described plate 1 except that its extent in the direction A is considerably reduced as compared with that of the plate 1. The base plate 29 is provided with two opposite substantially vertically disposed side plates 30 that are the equivalent of the previously described side plates 2 but that are somewhat different in shape as will become apparent from a comparison between FIGS. 2 and 7 of the drawings. Once again, the two side plates 30 project downwardly below the horizontal level of the base plate 29 and have straight leading edges which are upwardly and rearwardly inclined with respect to the direction A from the foremost extremities of the substantially horizontally disposed lower edges. Each plate 30 has a relatively short substantially horizontal upper edge and a rear edge, with respect to the direction A, that is in two portions. An inclined portion extends downwardly and rearwardly relative to the direction A from the rearmost end of the upper edge while a substantially vertical portion interconnects the rearmost and lowermost end of the inclined portion and the rearmost end of the substantially horizontally disposed lower edge. A supporting plate 31 which is equivalent to the previously described supporting plate 3 is secured to the right-hand side plate 30 of the plough frame when that frame is viewed from the rear in the direction A but it will be noticed that, while the supporting plate 31 has the same basic shape as does the supporting plate 3, the supporting plate 31 is of smaller size than the supporting plate 3, particularly having regard to the extents of those two plates in the corresponding directions A. The supporting plate 31 is in parallel relationship with the underlying base plate 29 and three lateral displacing members 32, 33 and 34, that are all of rotary construction, are mounted between the base plate 29 and the supporting plate 31 so as to be rotatable about corresponding relatively parallel axes that are vertically or substantially vertically disposed. The three lateral displacing members 32, 33 and 34 are of the same formation as the previously described members 4 to 8 inclusive, again being constructed as rollers but, in this case, only the leading (with respect to the direction A) member/roller 32 is of right circular cylindrical configuration having a smooth outer curved surface that is not provided with soil catches. The second and third members/rollers 33 and 34, considered rearwardly of the direction A, are both of upwardly tapering truncated conical configuration and the outer surface of each of them is provided with an assembly of plates such as the assembly of plates 12 that can be seen in FIG. 6 of the drawings in respect of the member/roller 34.

As in the preceding embodiment, the three lateral displacing members 32, 33 and 34 are drivingly interconnected by a chain and sprocket wheel transmission 35 that is located substantially wholly above the supporting plate 31. An upward extension of a shaft (equivalent to one of the previously described shafts 9) that affords the axis of rotation of the member/roller 33 is connected to the rotary output shaft of a hydraulic motor 36 which is fastened to the right-hand side plate 30. An annular soil guide member 37 is arranged to the rear of the base plate 29 relative to the direction A and is disposed substantially symmetrically between the two side plates 30 of the plough frame. The guide member 37 is rotatably supported by a number of rollers 38 (FIGS. 7 and 8) and its general plane is inclined upwardly and rearwardly, relative to the direction A, from that of the base plate 29 at an angle of substantially 45°. Accordingly, the axis of rotation of the guide member 37 is oppositely inclined downwardly and rearwardly, relative to the direction A, towards ground level at an angle of substantially 45° to the horizontal when the plough is disposed on flat horizontal land. The member 37 is driven to rotate about said axis by a transmission which comprises a sprocket wheel 39 and a co-operating chain 40 that engages a circular row of teeth (FIG. 8) around the periphery of the member 37. The sprocket wheel 39 is secured to one end of a shaft 41 that is rotatably mounted in a bearing sleeve 42. The bearing sleeve 42 is bolted to a pair of spaced horizontal beams 43, of channel-shaped cross-section, that rigidly interconnect the two frame side plates 30 alongside the upper inclined portions of the rear edges of those two side plates. The upper leading end of the shaft 41 projects from the bearing sleeve 42 and is there provided with a sprocket wheel 44 that is placed in driven connection with a somewhat smaller sprocket wheel 46 by a transmission chain 45. The sprocket wheel 46 is secured to a shaft 47 that is rotatably mounted in a bearing assembly carried by one limb of a transverse beam 50 that is of L-shaped cross-section and that rigidly interconnects the two frame side plates 30 in parallel relationship with the two beams 43. A universal joint places the obliquely disposed shaft 47 in driven connection with the rear end of a shaft 48 that is in substantially horizontally parallel relationship with the direction A, a forward location on said shaft 48 being rotatably supported by a bearing assembly which is carried by the upright limb of a beam 49, again of L-shaped cross-section, that rigidly interconnects the two side plates 30 in parallel relationship with the beams 43 and 50. It is noted that the top of the hydraulic motor 36 is additionally secured to the horizontal limb of the transverse beam 49. The leading end of the shaft 48 projects forwardly from the bearing assembly that is carried by the transverse beam 49 and is splined to enable it to be placed in driven connection with the power take-off shaft of an agricultural tractor or other operating vehicle through the intermediary of a telescopic transmission shaft which has universal joints at its opposite ends and which is of a construction that is known per se, a rear end region of such an intermediate transmission shaft being shown diagrammatically in FIG. 7 of the drawings.

In addition to carrying the bearing assembly for the rotary shaft 47, the transverse beam 50 is secured to a curved plate 51 that effectively constitutes a rearward and upward extension of the supporting plate 31, the shape of the curved plate 51 being evident in FIGS. 6 and 7 of the drawings from the former of which it will be clear that said curved plate extends throughout the space between the two side plates 30 whereas the supporting plate 31 does not. An upper rear region of the curved plate 51 extends into the rotary soil guide member 37 where it is given a substantially cylindrical curvature of downwardly facing concave configuration. It can also be seen in FIGS. 7 and 8 of the drawings that the interior of the annular soil guide member 37 is provided with a plurality, such as eight, of substantially radially disposed soil catch plates or catches 52 that are spaced apart from one another at regular intervals, for example 45°, around the axis of rotation of the member 37. FIGS. 6 and 7 of the drawings show that an oblique soil guide 53 interconnects the base plate 29 and the left-hand side plate 30 of the frame at a location which is substantially opposite to the member/roller 34 considered in the direction A. The rearmost extremity of the soil guide 53 closely adjoins the periphery of the rotary guide member 37 as can be seen best in FIG. 7 of the drawings.

In the use of the plough that has been described with reference to FIGS. 6 to 8 of the drawings, substantially the same initial adjustments will, if necessary, be made as have been described above in connection with the embodiment of FIGS. 1 to 5 of the drawings. The base plate 29 again constitutes a guide element for the furrow slice that is cut loose by the blade 18 between the two side plates 30 whose leading edges may be sharpened to form knife edges. The right-hand extremity of the cut furrow slice, when viewed from the rear of the plough in the direction A, is again progressively compressed and deflected towards the left-hand side plate 30 while, although commencing somewhat later, the left-hand extremity of the same furrow slice is upwardly deflected towards the blade-like soil catch plates 52 of the annular guide member 37 by the soil guide 53. These co-operating actions partially roll up the cut furrow slice and facilitate its subsequent substantially total inversion. It will be appreciated that the drive transmission between the shaft 48 and the ring of teeth on the soil guide member 37 is a high ratio step-down transmission so that said member 37 rotates relatively slowly about its longitudinal axis as compared with the shaft 48. The catch plates 52 of the member 37 engage the already partially rolled up furrow slice and displace it further in the direction that is indicated by arrows in FIGS. 6 and 8 of the drawings, the originally lowermost surface of the slice being urged into contact with the substantially cylindrically shaped concave lower surface of the rear end of the plate 51. The furrow slice falls back substantially wholly into the furrow from which it was cut in a substantially completely inverted condition. The substantially completely inverted furrow slice is deposited back into the furrow from which it was cut via the bottom of the curved plate 51 and the top of the annular guide member 37, as shown in broken lines at the right-hand sides of FIGS. 6 and 7 of the drawings. The spacing between these parts determines the maximum thickness of the inverted furrow slice that is deposited back into the furrow from which it was cut as is illustrated diagrammatically in broken lines at the right-hand side of FIG. 7. It is noted that, as in the embodiment of FIGS. 1 to 5 of the drawings, the leading lateral displacing member/roller 32, with respect to the direction A, is again revolved at the highest speed of the three members/rollers 32 to 34 inclusive, the member/roller 32 having a smooth cylindrically curved outer surface. If desired, the drive transmission to the rotary soil guide member 37 may include a change-speed gear to enable that member 37 to be revolved at faster or slower speeds without having to change the speed of initiating rotation of the power take-off shaft of the agricultural tractor or other vehicle which moves and operates the plough. A further alternative is to drive the member 37 from a second hydraulic motor whose speed of operation will be readily controllable, in a manner that is known per se, from the driving seat of the operating tractor or other vehicle.

Although certain features of the ploughs that have been described and/or that are illustrated in the accompanying drawings will be set forth in the claims as inventive features, it is emphasised that the invention is not necessarily limited to those features and that it includes within its scope each of the parts of each plough that has been described, and or that is illustrated in the accompanying drawings, both individually and in various combinations.

I claim:

1. A plow comprising a mobile frame and a plow member supported on said frame, said member including a channel shaped trough and a soil cutting means at the front thereof, at least one movable soil displacing guide within said trough positioned to engage and laterally move a furrow slice of earth cut by said cutting means during operation, said member also comprising guide means having an upwardly curved surface located adjacent said guide, to the rear of said cutting means, said guide including a row of displacing guide rollers that are rotatable about upwardly extending axes and said row extending in the general direction of plow travel, said rollers progressively increasing in diameter from front to rear and driving means connected to rotate said guide rollers, said guide means being positioned to engage the furrow slice as the latter is moved from front to the rear of said rollers and invert the slice whereby the inverted slice is deposited to the rear in the furrow being formed.

2. A plow as claimed in claim 1, wherein a leading displacing roller has a smooth external surface, at least one further roller having an assembly of circumferentially projecting soil catches.

3. A plow as claimed in claim 1, wherein said rollers are rotated by drive means and said guide means includes a rotary unit that is rotated about a nonvertical axis by said driving means.

4. A plow comprising a mobile frame and a plow member supported on said frame, said member including soil cutting means in front of a channel-shaped trough positioned to receive a furrow slice, a row of rotatable soil displacing guide rollers located within said trough adjacent one side thereof, said rollers being positioned to engage the furrow slice and progressively displace and compress same towards one lateral side of the trough as the slice is moved to the rear, guide means defining an upwardly curved surface being located adjacent and to the rear of said rollers to receive the compressed and turning furrow slice as the latter is moved from front to rear and then invert the slice whereby the inverted slice is deposited to the rear in the furrow being formed.

5. A plow as claimed in claim 4, wherein said surface is afforded by an upwardly curved plate located rearwardly of said displacing member, said plate extending rearwardly from the cutting means.

6. A plow as claimed in claim 5, wherein said driving means includes a drive transmission positioned above the displacing rollers and said transmission is arranged to rotate all of the rollers in the same direction.

7. A plow as claimed in claim 6, wherein said transmission is connected to rotate the leading roller at a greater speed than the rearmost roller.

8. A plow as claimed in claim 5, wherein said guide means is a rotatable unit of annular configuration with its axis of rotation being upwardly and forwardly inclined, soil catches being mounted at the front of said unit.

9. A plow as claimed in claim 8, wherein said axis of rotation of the unit is inclined to a level surface upon which the plow stands at an angle of about 45°, said driving means being connected to rotate said unit.

10. A plow as claimed in claim 5, wherein said frame is supported by two ground wheels with adjusting means that enable said wheels to be upwardly and downwardly adjustable in position, coupling means on said frame being positioned for cooperation with the three-point lifting device of a tractor.

11. A plow as claimed in claim 10, wherein said driving means is arranged to be driven from the power take-off shaft of the tractor.

12. A plow as claimed in claim 4, wherein said rollers are tapered in an upwardly direction.

13. A plow as claimed in claim 4, wherein said cutting means includes a soil cutting V-shaped blade positioned at the front of said trough, the point of the blade being at the rear thereof.

* * * * *